United States Patent [19]
Burton

[11] Patent Number: 5,771,526
[45] Date of Patent: Jun. 30, 1998

[54] ENCLOSURE AND METHOD FOR CONCEALING REAR WINDSHIELD WIPERS OF AUTOMOBILES

[76] Inventor: Clifford Keefe Burton, 1412 17th St. Apt. #3, Santa Monica, Calif. 90404-2825

[21] Appl. No.: 754,788

[22] Filed: Nov. 21, 1996

[51] Int. Cl.⁶ .................................. B60S 1/04; B60S 1/58; B67D 25/08
[52] U.S. Cl. ................................. 15/250.19; 15/250.001; 296/146.15; 296/96.17; 296/37.1; 29/428; 29/DIG. 1
[58] Field of Search .......................... 15/250.19, 250.16, 15/250.001, 250.3, 250.31, 250.34; 296/146.15, 146.1, 96.17, 96.15, 37.1; 29/428, DIG. 1

[56] References Cited

U.S. PATENT DOCUMENTS

| | | | |
|---|---|---|---|
| 1,973,071 | 9/1934 | Hilton | 15/250.19 |
| 2,936,477 | 5/1960 | Feller | 15/250.19 |
| 3,363,277 | 1/1968 | Hoessner | 15/250.19 |
| 4,141,102 | 2/1979 | Lawrence | 15/250.19 |
| 4,310,943 | 1/1982 | Palma | 15/250.19 |
| 4,756,568 | 7/1988 | Yamamoto et al. | 15/250.16 |
| 4,962,564 | 10/1990 | Onda et al. | 15/250.19 |
| 5,415,453 | 5/1995 | Huber | 15/250.16 |

FOREIGN PATENT DOCUMENTS

| | | | |
|---|---|---|---|
| 4314435 | 11/1994 | Germany | 15/250.001 |
| 152950 | 7/1987 | Japan | 15/250.001 |
| 5-105033 | 4/1993 | Japan | 15/250.19 |
| 824893 | 12/1959 | United Kingdom | 15/250.16 |
| 1071838 | 6/1967 | United Kingdom | 15/250.19 |

*Primary Examiner*—Gary K. Graham

[57] ABSTRACT

A new Enclosure For Concealing Rear Windshield Wipers Of Automobiles for enhancing the appearance of automobiles. The inventive device includes an elongated tray having a hole for passing the wiper drive shaft, an adhesive for detachably securing the tray to the rear windshield, a flexible flap for protecting the wiper from the elements, and a drain hole for allowing draining of moisture from the tray.

9 Claims, 4 Drawing Sheets

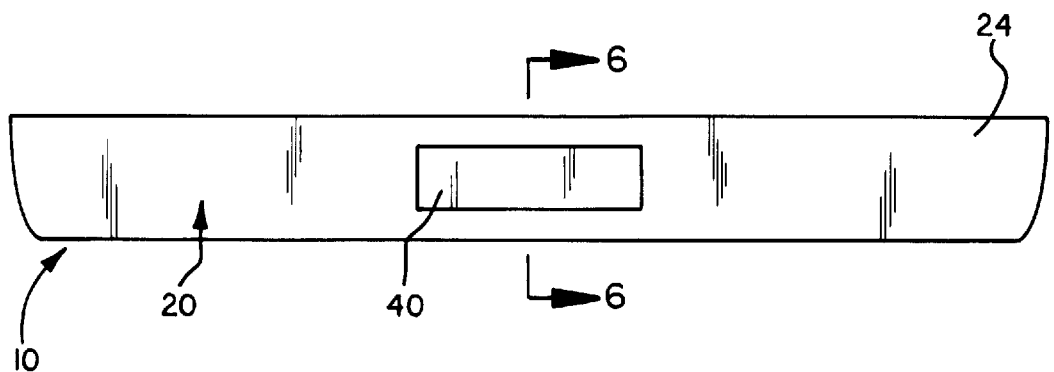
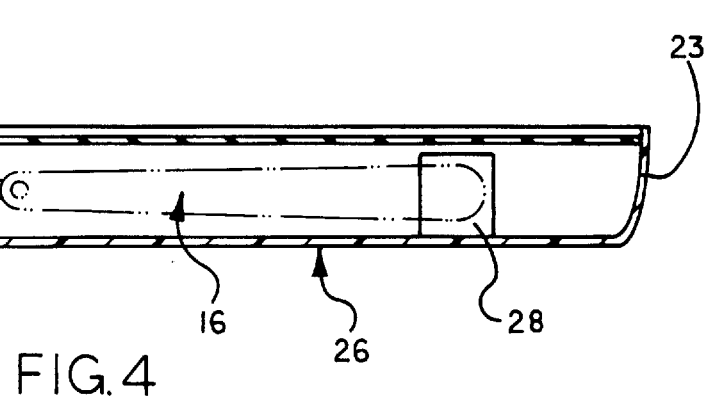

ENCLOSURE AND METHOD FOR CONCEALING REAR WINDSHIELD WIPERS OF AUTOMOBILES

BACKGROUND OF THE INVENTION

1. Field of the Invention

The present invention relates to concealed windshield wipers and more particularly pertains to a new Enclosure For Concealing Rear Windshield Wipers Of Automobiles for enhancing the appearance of automobiles.

2. Description of the Prior Art

The use of concealed windshield wipers is known in the prior art. More specifically, concealed windshield wipers heretofore devised and utilized are known to consist basically of familiar, expected and obvious structural configurations, notwithstanding the myriad of designs encompassed by the crowded prior art which have been developed for the fulfillment of countless objectives and requirements.

Known prior art concealed windshield wipers include U.S. Pat. No. 4,756,568; U.S. Pat. No. 4,962,564; U.S. Pat. No. 4,770,462; U.S. Pat. No. 4,783,876; U.S. Pat. No. 5,381,582 and U.S. Pat. No. 4,122,578.

While these devices fulfill their respective, particular objectives and requirements, the aforementioned patents do not disclose a new Enclosure For Concealing Rear Windshield Wipers Of Automobiles. The inventive device includes an elongated tray having a hole for passing the wiper shaft, an adhesive tape for securing the tray to the rear windshield, a drain hole for draining water, and a flexible rubber flap for protecting the stowed wiper blade from sun, rain, snow, dirt, etc.

In these respects, the Enclosure For Concealing Rear Windshield Wipers Of Automobiles according to the present invention substantially departs from the conventional concepts and designs of the prior art, and in so doing provides an apparatus primarily developed for the purpose of enhancing the appearance of automobiles.

SUMMARY OF THE INVENTION

In view of the foregoing disadvantages inherent in the known types of concealed windshield wipers now present in the prior art, the present invention provides a new Enclosure For Concealing Rear Windshield Wipers Of Automobiles construction wherein the same can be utilized for enhancing the appearance of automobiles.

The general purpose of the present invention, which will be described subsequently in greater detail, is to provide a new Enclosure For Concealing Rear Windshield Wipers Of Automobiles apparatus and method which has many of the advantages of the concealed windshield wipers mentioned heretofore and many novel features that result in a new Enclosure For Concealing Rear Windshield Wipers Of Automobiles which is not anticipated, rendered obvious, suggested, or even implied by any of the prior art concealed windshield wipers, either alone or in any combination thereof.

To attain this, the present invention generally comprises an elongated tray having a hole for passing the wiper shaft, an adhesive tape for securing the tray to the rear windshield, a drain hole for draining water, and a flexible rubber flap for protecting the stowed wiper blade from sun, rain, snow, dirt, etc.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Enclosure For Concealing Rear Windshield Wipers Of Automobiles apparatus and method which has many of the advantages of the concealed windshield wipers mentioned heretofore and many novel features that result in a new Enclosure For Concealing Rear Windshield Wipers Of Automobiles which is not anticipated, rendered obvious, suggested, or even implied by any of the prior art concealed windshield wipers, either alone or in any combination thereof.

It is another object of the present invention to provide a new Enclosure For Concealing Rear Windshield Wipers Of Automobiles which may be easily and efficiently manufactured and marketed.

It is a further object of the present invention to provide a new Enclosure For Concealing Rear Windshield Wipers Of Automobiles which is of a durable and reliable construction.

An even further object of the present invention is to provide a new Enclosure For Concealing Rear Windshield Wipers Of Automobiles which is susceptible of a low cost of manufacture with regard to both materials and labor, and which accordingly is then susceptible of low prices of sale to the consuming public, thereby making such Enclosure For Concealing Rear Windshield Wipers Of Automobiles economically available to the buying public.

Still yet another object of the present invention is to provide a new Enclosure For Concealing Rear Windshield Wipers Of Automobiles which provides in the apparatuses and methods of the prior art some of the advantages thereof, while simultaneously overcoming some of the disadvantages normally associated therewith.

Still another object of the present invention is to provide a new Enclosure For Concealing Rear Windshield Wipers Of Automobiles for enhancing the appearance of automobiles.

Yet another object of the present invention is to provide a new Enclosure For Concealing Rear Windshield Wipers Of Automobiles which includes an elongated tray having a hole for passing the wiper shaft, an adhesive tape for securing the tray to the rear windshield, a drain hole for draining water, and a flexible rubber flap for protecting the stowed wiper blade from sun, rain, snow, dirt, etc.

Still yet another object of the present invention is to provide a new Enclosure For Concealing Rear Windshield Wipers Of Automobiles that is simple to install and is affordable.

Even still another object of the present invention is to provide a new Enclosure For Concealing Rear Windshield Wipers Of Automobiles that is adaptable to different rear window wiper configurations.

Even still another object of the present invention is to provide a new Enclosure For Concealing Rear Windshield Wipers Of Automobiles that protects the wiper blade from sun fade, deterioration, and ice accumulation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a rear view of the elongated tray.

FIG. 4 is a sectional view of the elongated tray with the wiper blade assembly in a stowed, non-use position.

DESCRIPTION OF THE PREFERRED EMBODIMENT

Figure 1:
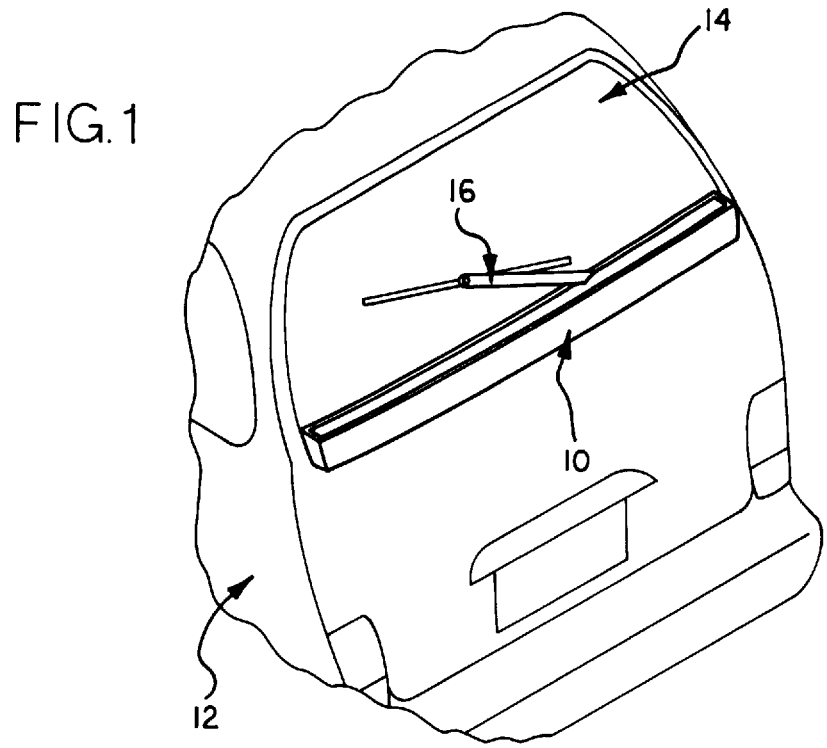
FIG. 1 is a rear perspective view of a bottom mounted wiper and elongated tray according to the present invention.

With reference now to the drawings, and in particular to FIGS. 1 through 8 thereof, a new Enclosure For Concealing Rear Windshield Wipers Of Automobiles embodying the principles and concepts of the present invention and generally designated by the reference numeral 10 will be described.

More specifically, it will be noted that the Enclosure For Concealing Rear Windshield Wipers Of Automobiles 10 comprises an elongated tray 20 attached to the rear windshield 14 of an automobile 12 and adapted to conceal the rear windshield wiper assembly 16 when the wiper assembly is not in use.

Figure 2:
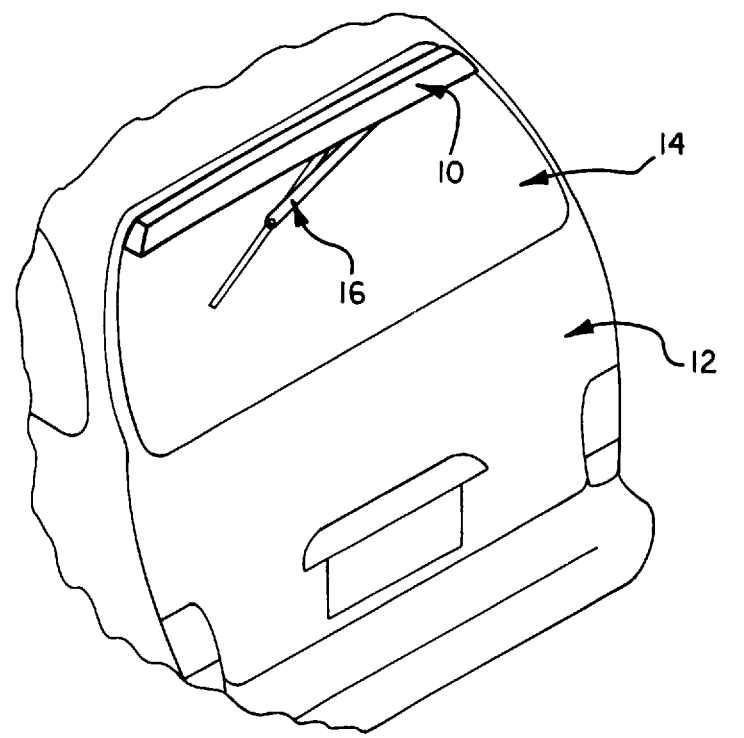
FIG. 2 is a rear perspective view of a top mounted wiper and elongated tray according to the present invention.
Figure 5:
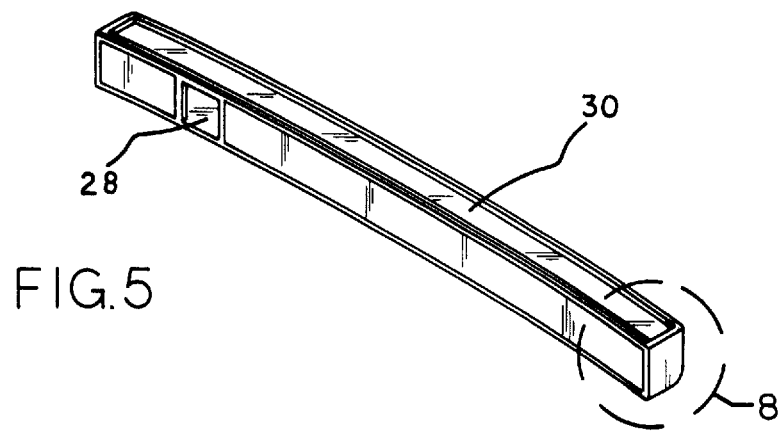
FIG. 5 is a front perspective view of the elongated tray.
Figure 6:
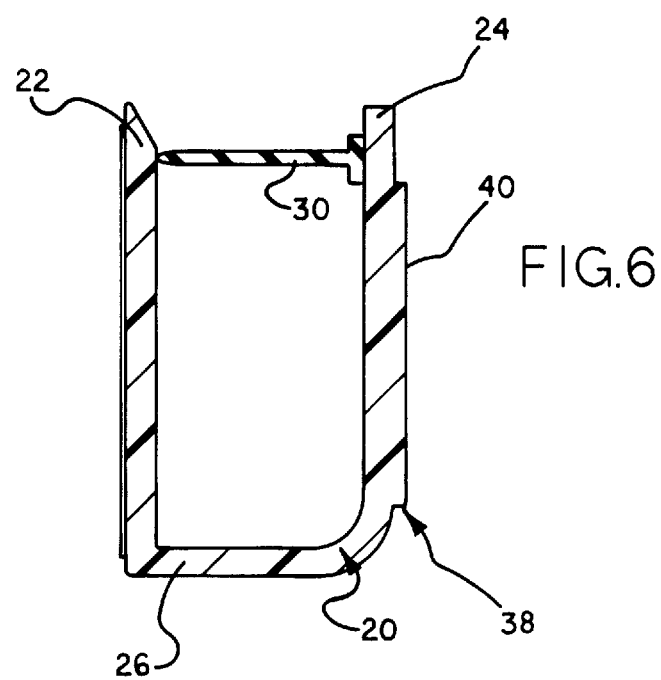
FIG. 6 is a cross sectional view taken along line 6—6 of FIG. 3.
Figure 7:
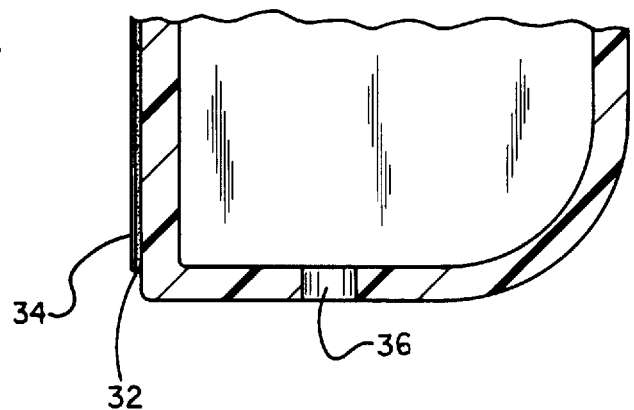
FIG. 7 is a partial sectional view of a portion of the tray showing the drain hole.
Figure 8:
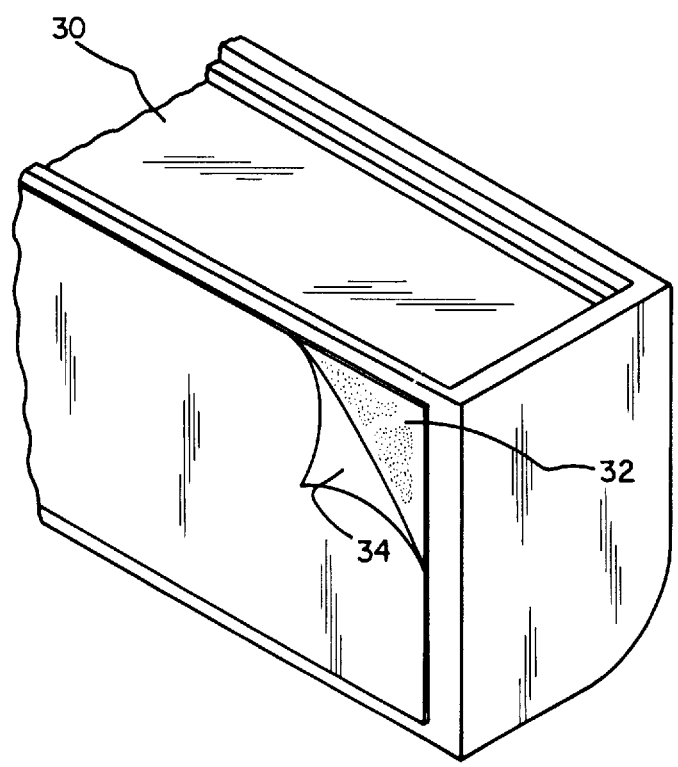
FIG. 8 is a partial sectional view of the portion encircled by line 8 of FIG. 5.

As best illustrated in FIGS. 1 through 8, it can be shown that the elongated tray 20 includes a front sidewall 22, a rear sidewall 24, a bottom wall 26, and end walls 23,25. The tray can be formed of a material which suits the needs of the individual user. For instance, metal or plastic materials can be used, as these materials can withstand the environmental conditions imposed on the tray. The bottom wall 26 spaces the front and rear sidewalls 22 from each other to define an open space which receives the wiper assembly 16 when the tray is installed. A hole 28 is formed through the front sidewall 22 at a predetermined position along the length of the tray. The hole 28 is sized so as to freely allow passage of a wiper assembly drive shaft (not shown) which drives the wiper assembly. It is clear that the hole 28 should be appropriately located in the front sidewall 22 to accommodate different rear wiper configurations. For instance, as seen in FIG. 1, some automobiles have the rear windshield wiper mounted adjacent the bottom of the windshield, and therefore the tray is mounted along the lower edge of the windshield and the hole 28 is appropriately located so as to accommodate the wiper drive shaft. Alternately, as seen in Fig. 2, the rear wiper can be mounted adjacent the top of the windshield, and therefore the tray is mounted along the top edge of the windshield with the hole 28 appropriately located for this configuration. The tray should be sized to fit the rear windshield and rear wiper of the particular vehicle the tray is to be used with. For instance, a tray having a length of approximately 36" and a depth from top to bottom of approximately 3–5", preferably 4", would fit many rear windshields and rear wiper assemblies. Referring to FIGS. 4 and 6, a flexible rubber flap 30 is disposed near the top edges of the sidewalls 22,24 to close-off the open space of the tray. One edge of the flap is fixedly secured to the rear sidewall 24, while the opposite flap edge is in sealing contact with the front sidewall 22, to deter entry of rain, sleet, snow, dirt, etc., into the open space of the tray. However, the opposite flap edge is allowed to freely pivot due to the attached edge of the flap and the flexible nature of the flap, to allow exiting and entry of the rear wiper assembly. An adhesive tape 32 with a peel-off covering 34 is disposed along the front sidewall 22, thus providing a means for attaching the tray 20 to the rear windshield 14. The user simply removes the peel-off covering 34 to expose the adhesive 32, and secures the tray to the desired location on the rear windshield. Since moisture is not completely prevented by the flap from entering the open space, a drain hole 36 is formed through the bottom wall 26 to allow escape of moisture from the tray. The drain hole 36 has particular use in the bottom mounted configuration shown in FIG. 1. However, the top mounted configuration of FIG. 2 would also benefit from a drain hole 36 by permitting increased evaporation of moisture from the tray which the wiper assembly carries into the tray. It is to be understood that although a single drain hole 36 is illustrated, a plurality of drain holes along the tray could be used as well.

In order to improve the appearance of the tray, a raised area 38 is provided on the rear sidewall 24. The raised area 38 includes a flat, planar surface 40 parallel to the rear sidewall 24. The flat surface 40 provides a prominent area for the disposition of various decorative indicia, such as an auto makers logo.

In use, the user first decides on a bottom or top mounted tray, based upon whether the rear wiper assembly is bottom or top mounted. Further description will be based upon a bottom mounted configuration, but it is clear that a top mounted configuration functions in a similar manner. The tray is detachably fastened to the rear windshield by removing the peel-off covering to expose the adhesive and securing the tray to the windshield, with the wiper drive shaft extending through the hole in the front sidewall. Removal of the wiper assembly from the wiper assembly drive shaft is necessary to mount the tray, with reattachment of the wiper assembly after mounting. As is understood in the art, the wiper assembly has a stowed, non-use position where the wiper assembly will be generally parallel with the lower edge of windshield. The wiper assembly also has a use position where the wiper assembly is supported for movement back and forth across the windshield. In the stowed position, the wiper assembly is completely disposed within the tray and completely hidden from view (see dashed lines in FIG. 4). When the wiper is to be used, the wiper assembly is pivoted by the drive shaft from the tray for its subsequent back and forth movements. Note that the flexible nature of the flap 30 freely permits movements of the wiper assembly into and out of the tray. When wiping is complete, the wiper assembly pivots back to the stowed position and is hidden by the tray.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. In an automobile having a rear windshield defining a substantially planar surface with a top and bottom, rear windshield wiper enclosure arrangement mounted on said rear windshield, said arrangement comprising:

an elongated tray, said elongated tray having front and rear spaced apart elongated sidewalls joined by a bottom wall and end walls to define an open space therebetween, said first sidewall detachably secured in facing relationship on and to said planar surface of said rear windshield;

a rear wiper means having a wiper blade assembly supported for movement back and forth across the rear windshield during use and retained at a stowed position when the wiper means is not in use, said wiper blade assembly at the stowed position being completely accommodated within the open space of said elongated tray, said elongated tray configured for permitting movements of said wiper blade assembly between the use and non-use positions.

2. In an automobile as set forth in claim 1, wherein the rear wiper means is mounted adjacent the top of the rear windshield, and said elongated tray is secured along the top of the rear windshield.

3. In an automobile as set forth in claim 1, wherein the rear wiper means is mounted adjacent the bottom of the rear windshield, and said elongated tray is secured along the bottom of the rear windshield.

4. In an automobile as set forth in claim 1, further comprising a drain hole in the bottom wall.

5. In an automobile as set forth in claim 1, wherein the elongated tray is adhesively secured to the rear windshield.

6. In an automobile as set forth in claim 1, wherein the front sidewall includes a hole having a size sufficient to allow passage of a wiper shaft of the wiper blade assembly.

7. In an automobile as set forth in claim 1, further comprising a flexible rubber flap spaced apart from and parallel to the bottom wall, said flap having two ends, one end attached to the rear sidewall near the top of the rear sidewall, and the other end disposed adjacent the front sidewall.

8. In an automobile as set forth in claim 1, wherein the rear sidewall includes a raised area on its surface, said raised area including a flat rear surface for supporting indicia.

9. A method of concealing a rear windshield wiper assembly on an automobile having a rear windshield defining a substantially planar surface, said wiper assembly supported for movement back and forth across the rear windshield during use and retained at a stowed position when the wiper assembly is not in use, comprising:

detachably securing an elongated tray to the rear windshield, said elongated tray having front and rear spaced apart elongated sidewalls joined by a bottom wall and end walls to define an open space therebetween, said front side wall detachably secure in facing relationship on and to said planar surface of said rear windshield, and simultaneously positioning the elongated tray relative to the wiper assembly so that said wiper assembly at the stowed position is completely accommodated within the open space of said elongated tray, said elongated tray configured for permitting movements of said wiper assembly between the use and non-use positions.

* * * * *